July 31, 1962 J. W. GRAY 3,047,808
INTEGRATOR WITH MEANS FOR COMPENSATING FOR
CAPACITY ABSORPTION EFFECTS
Filed Feb. 6, 1959 2 Sheets-Sheet 1

INVENTOR.
JOHN W. GRAY
BY H. S. Mackey
ATTORNEY.

INVENTOR.
JOHN W. GRAY
BY H. L. Mackey
ATTORNEY.

United States Patent Office 3,047,808

Patented July 31, 1962

3,047,808

INTEGRATOR WITH MEANS FOR COMPENSATING FOR CAPACITY ABSORPTION EFFECTS

John W. Gray, Pleasantville, N.Y., assignor to General Precision, Inc., a corporation of Delaware Filed Feb. 6, 1959, Ser. No. 791,672
1 Claim. (Cl. 328—127)

This invention relates to electronic integrating circuits employing capacitive feedback, and provides compensation for the absorbing effect of the capacitor used in the feedback path.

Integrators of the capacitive feedback type employ a high-gain amplifier having a negative feedback path joining the input and output terminals, with a capacitor interposed in this feedback path. A series resistor is provided at the amplifying input. Such an integrator can be termed a feedback amplifier RC integrator, and is sometimes referred to as a "Miller feedback" integrator because qualitatively the feedback capacitor has the same effect as grid-plate feedback capacitance in an electronic tube circuit. The integration effect by an amplifier-RC integrator is exact when the amplifier has infinite gain, assuming the capacitor dielectric has no absorbent quality.

Integrators of this type are described in volume 21 of the Radiation Laboratory Series entitled Electronic Instruments, by Greenwood, Holdam and MacRae, on p. 79 et seq.

In practice all capacitor dielectrics have, at least to some extent, the quality of having time delay in absorbing a charge and in giving up a charge. The effect is termed the absorbent, or "soaking" effect. This effect is well known and is described in vol. 21, supra, on page 68. The effect of this dielectric phenomenon is to cause the integrated output of the integrator to be in error, even though the amplifier employed has infinite gain.

One purpose of this invention is to provide a corrective circuit for association with such an integrator for eliminating this error in the integrated output. The corrective circuit consists of a number of resistors and one or more capacitors, all associated with or taking the place of the series resistor of the integrator. By increasing the number of RC circuits contained within the corrective circuit, the absorptive property of the integrator capacity may be neutralized as nearly perfectly as may be desired.

In the operation of an ideal integrator, the time phase of the output lags the input by 90°. One effect of capacitor absorbency is to introduce a time lag in the negative feedback path because of the slowness of the dielectric in absorbing its charge and in giving it up. This lag in the negative feedback path is tantamount to a phase lead in the direct or main path through the amplifier. This invention, through its corrective network in series with the amplifier main path, introduces a phase lag exactly equal in both magnitude and in form to this phase lead, which is, therefore, cancelled. There is left, then, the exact quadrature lag of the ideal integrator.

Another purpose of this invention, therefore, is to provide an integrator having an output phase lag of exactly 90°.

Still another purpose of this invention is to provide a circuit for integrating by electronic means with a fidelity approaching that of the unrealizable ideal integrator.

Further understanding of this invention may be secured from the detailed description and drawings, in which.

Figure 1:
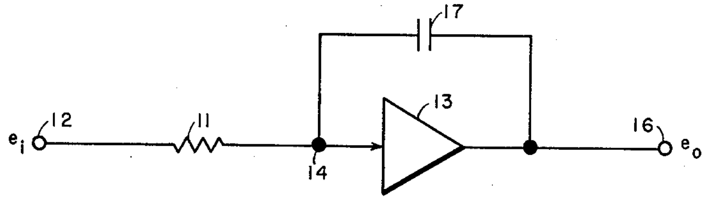
FIGURE 1 is a schematic diagram of a feedback amplifier RC integrator.

Referring now to FIG. 1, a series resistor 11 is connected between an input terminal 12 and an amplifier 13. The amplifier 13 contains an odd number of electronic tube stages, so that its output signals at terminal 16 are inverted relative to the input signals at terminal 14. This amplifier 13 must have high gain, and preferably has infinite gain. Such infinite gain is easily attained by feedback methods such as are described, for example, in vol. 21, supra, on p. 81. The amplifier 13 is bridged by a negative feedback electrostatic capacitor 17.

When the amplifier 13 has infinite gain, and neglecting the soaking effect of the capacitor 17 dielectric, the output potential $e_o$ at the integrator output terminal 16 is exactly the time integral of the input potential $e_i$ at terminal 12. This is, however, an ideal situation which has heretofore been unrealizable because of capacitor soaking effect which is always present and cannot be neglected. Therefore the circuit of FIG. 1 always causes $e_o$ to depart somewhat from the exact integral of $e_i$.

As an example of integration, when an abrupt change in $e_i$ occurs, the ideal integrator will produce a constantly changing $e_o$ having a constant rate of change proportional to the magnitude of the input step. In the practical integrator, the soaking effect always causes the output $e_o$ to have a lesser rate than this. That is, the ideal integral function is divided by an error term and thus the output potential $e_o$ takes longer to attain a prescribed level.

Figures 2, 3:
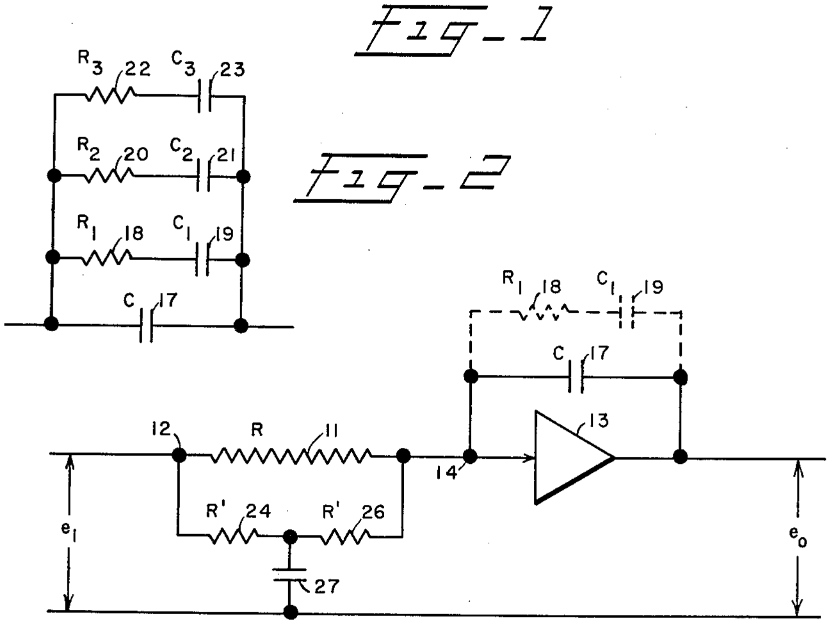
FIGURE 2 is the equivalent circuit of an electrostatic capacitor having absorption properties.
FIGURE 3 is a schematic circuit of a feedback amplifier RC integrator containing an absorption effect correcting circuit.

Analysis of this error term shows that the capacitor 17 having absorption behaves as if it were bridged by a series of resistor-capacitor branches. The equivalent circuit representing this apparent or imagined cause of the soaking effect is shown in FIG. 2, depicting three such fictitious branches having magnitudes $R_1C_1$, $R_2C_2$ and $R_3C_3$. In this figure capacitor 17 is the real or physical capacitor as in FIG. 1, having the rated steady-state capacitance C, and the other resistors and capacitors 18, 19, 20, 21, 22 and 23 are fictitious. These combinations of fictitious resistance and capacitance all have different values and their products constitute differing time constants. For example, $R_1C_1$ is the smallest and may have a value between 30 and 60 seconds. The next larger product, $R_2C_2$, has a value several times as large as that of $R_1C_1$, and $R_3C_3$ has a still larger value.

FIG. 3 shows an integrator with such an equivalent circuit, resistor 18 and capacitor 19 being drawn dashed to indicate their fictitious character. Neutralization of the soaking effect of this single branch is effected by the series resistor 11 in combination with equal resistors 24 and 26 and capacitor 27, forming a three-terminal network. Analysis of this circuit shows that this combination of three resistors in delta connection together with the capacitor 27 so modify the integral function as to introduce a correcting factor. When the constants of the circuit are properly chosen this correcting factor is precisely equal to the error term introduced by the soaking effect represented by the branch 18/19. Since the integral is multiplied by the correcting factor and divided by the error term, the effects cancel and the true integral is left.

The circuit constants which must be properly chosen are the equal resistances R′ of resistors 24 and 26 and the capacitance C′ of capacitor 27. The procedure for choosing these constants is as follows. Knowing the value C of capacitor 17, select the value R for resistor 11 according to the desired rate of change of $e_o$ per unit of input voltage $e_i$. Measure the values $R_1$ and $C_1$ of the equivalent resistor 18 and equivalent capacitor 19. This is done by applying a step potential $e_1$ and observing the output potential $e_o$ so as to secure a time-potential graph of the soaking effect. From these data the magnitudes of $R_1$ and $C_1$ are secured. The magnitude R′ of equal resistors 24 and 26 is then computed by the formula $$R'=\frac{RC}{2C_1} \quad (1)$$

and the magnitude C′ of capacitor 27 is computed by $$C'=\frac{2R_1C_1}{R'} \quad (2)$$

Figure 4:
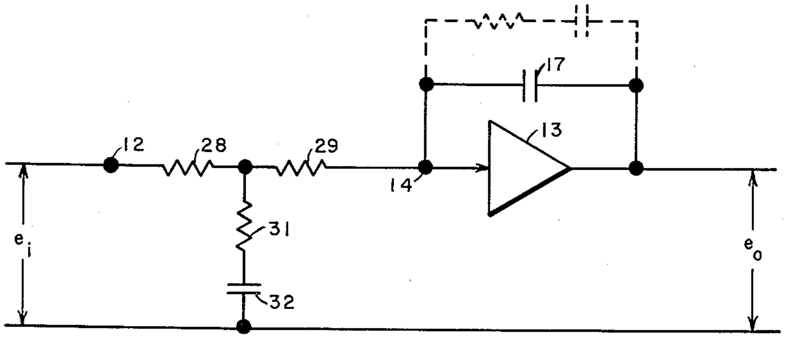
FIGURE 4 depicts an integrator containing a star form of correcting network.
Figure 5:
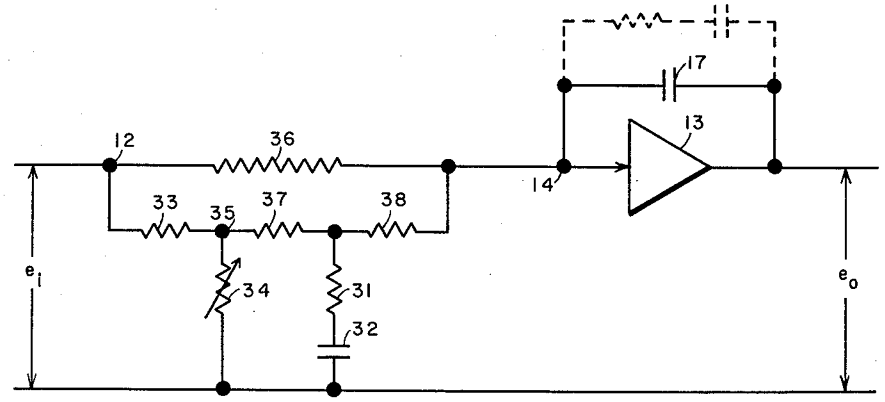
FIGURE 5 depicts an integrator having a correction network with provision for adjusting the potential charging the correcting capacitor.

The delta correcting circuit of FIG. 3 can be transformed, by employing conventional rules, to the equivalent star circuit of FIG. 4 having appropriate values for the resistors 28, 29 and 31 and the capacitor 32. This circuit is somewhat more convenient to use than the delta circuit because the potential applied to the capacitor in the correcting circuit can be adjusted for best results without disturbing the values of the components. This can be done by employing the circuit of FIG. 5, in which an adjustable voltage divider consisting of resistor 33 and rheostat 34 are connected between input terminal 12 and ground. The divided potential at junction 35 is applied to the capacitor 32. Values for resistors 36, 37, 38 and 33 are so selected as to duplicate the effects of resistors 28 and 29, FIG. 4. By adjustment of rheostat 34, the signal potential applied to capacitor 32 is adjusted to the value which best neutralizes the soaking effect. This adjustment causes the depicted compensating circuit to tend to compensate for the plurality of RC branches in the equivalent circuit shunting the amplifier, even though the design as described is predicated on the assumption of only one equivalent RC branch.

Figures 6, 7:
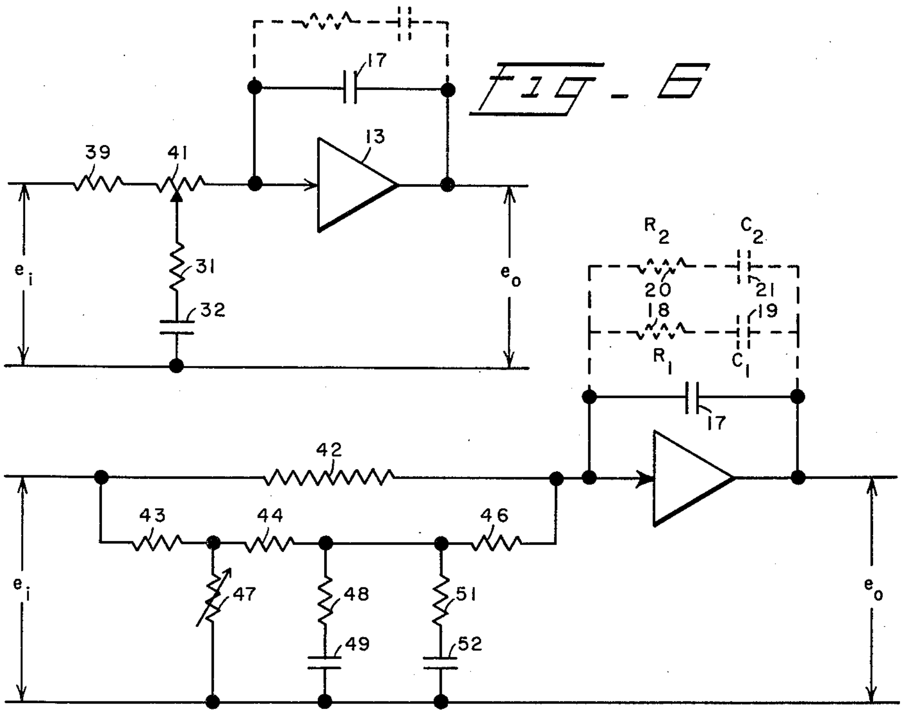
FIGURE 6 depicts another method of adjusting the potential charging the correcting capacitor.
FIGURE 7 is a schematic circuit applying the principles of this invention to neutralizing the absorbing effects as represented by more than one shunt RC branch of the equivalent circuit.

Another circuit for adjusting the potential on capacitor 32 is illustrated in FIG. 6. In this circuit the resistors 28 and 29, FIG. 4, are replaced by resistor 39 and potentiometer 41. Here the signal potential applied to capacitor 32 is controlled by the adjustment of potentiometer 41, without disturbing the other parameters.

Another way of correcting for additional fictitious shunt RC branches is shown in FIG. 7. In this figure two fictitious branches consisting of elements 18, 19, 20 and 21 are shown, having two different time constants $R_1C_1$ and $R_2C_2$. The compensating circuit consists of resistors 42, 43, 44 and 46, rheostat 47 and the two RC branches 48/49 and 51/52. This differs from the compensating circuit of FIG. 5 in having two RC branches. The added RC branch has values computed by the methods employed for the other circuits.

What is claimed is:

A feedback amplifier RC integrator exhibiting reduced dielectric soaking effect comprising,

- a high-gain amplifier,
- a shunt capacitor connected between the input and output terminals thereof, said capacitor having an absorbent dielectric and thereby exhibiting the phenomenon of soaking as if shunted by branches consisting of soaking capacitance and soaking resistance in series, whereby a time-potential error is inserted in the integrated output,
- a three-terminal network having first and second signal input terminals and a third terminal connected to the input terminal of said amplifier,
- said network including a single first resistor directly connected between said first and third terminals,
- at least a pair of resistors connected between said first and third terminals,
- a first capacitor and a first resistor connected in series between the common terminal of said pair of resistors and said second terminal, and
- a second capacitor connected in series between the common terminal of said pair of resistors and said second terminal.

References Cited in the file of this patent

UNITED STATES PATENTS

| | | |
|---|---|---|
| 2,480,511 | Schade | Aug. 30, 1949 |
| 2,511,564 | Callan | June 13, 1950 |
| 2,555,837 | Williams | June 5, 1951 |
| 2,622,231 | Gray | Dec. 16, 1952 |
| 2,745,007 | Thomas | May 8, 1956 |
| 2,757,283 | Ingerson | July 31, 1956 |
| 2,846,522 | Brown | Aug. 5, 1958 |
| 2,846,577 | Blasingame | Aug. 5, 1958 |
| 2,917,626 | Usher | Dec. 15, 1959 |

OTHER REFERENCES

Reference Data for Radio Engineers I.T. & T. New York, 1956 (4th ed.), page 142 relied on.